United States Patent
Ashitani

(10) Patent No.: US 9,723,195 B2
(45) Date of Patent: Aug. 1, 2017

(54) IMAGE CAPTURING APPARATUS, EXTERNAL DEVICE, IMAGE CAPTURING SYSTEM, METHOD FOR CONTROLLING IMAGE CAPTURING APPARATUS, METHOD FOR CONTROLLING EXTERNAL DEVICE, METHOD FOR CONTROLLING IMAGE CAPTURING SYSTEM, AND PROGRAM

(71) Applicant: CANON KABUSHIKI KAISHA, Tokyo (JP)

(72) Inventor: Satoshi Ashitani, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/034,172

(22) PCT Filed: Nov. 7, 2014

(86) PCT No.: PCT/JP2014/005598
§ 371 (c)(1),
(2) Date: May 3, 2016

(87) PCT Pub. No.: WO2015/072116
PCT Pub. Date: May 21, 2015

(65) Prior Publication Data
US 2016/0277662 A1 Sep. 22, 2016

(30) Foreign Application Priority Data
Nov. 13, 2013 (JP) ................. 2013-234960

(51) Int. Cl.
*H04N 5/232* (2006.01)

(52) U.S. Cl.
CPC ........ *H04N 5/23206* (2013.01); *H04N 5/232* (2013.01); *H04N 5/23216* (2013.01)

(58) Field of Classification Search
CPC .......... H04N 5/23206; H04N 5/23216; H04N 5/232; H04N 5/23203
(Continued)

(56) References Cited

U.S. PATENT DOCUMENTS

| | | | |
|---|---|---|---|
| 7,701,488 B2 * | 4/2010 | Chen | H04N 5/23203 348/211.9 |
| 7,839,926 B1 | 11/2010 | Metzger | |

(Continued)

FOREIGN PATENT DOCUMENTS

| | | |
|---|---|---|
| JP | H08-205015 A | 8/1996 |
| JP | 10-191308 A | 7/1998 |

(Continued)

*Primary Examiner* — Pritham Prabhakher
(74) *Attorney, Agent, or Firm* — Canon U.S.A., Inc. IP Division

(57) ABSTRACT

An image capturing apparatus that communicates with an external device includes a field-of-view changing unit configured to change a field of view for capturing an image of a subject, a receiving unit, a control unit, and an amount-of-change determination unit. The receiving unit receives, from the external device, a command for controlling the field-of-view changing unit. The control unit controls, when the receiving unit receives a command to start to change a field of view, the field-of-view changing unit to start to change the field of view. The amount-of-change determination unit determines an amount of change in the field of view. The control unit controls the field-of-view changing unit such that the determined amount of change in the field of view becomes a predetermined amount or more, irrespective of whether the receiving unit receives a command to stop changing the field of view using the field-of-view changing unit.

16 Claims, 16 Drawing Sheets

(58) Field of Classification Search
USPC .......................................... 348/207.1, 211.13
See application file for complete search history.

(56) References Cited

U.S. PATENT DOCUMENTS

| | | | | |
|---|---|---|---|---|
| 8,953,051 | B2* | 2/2015 | Otsuka | H04N 5/23206 348/207.1 |
| 9,160,899 | B1* | 10/2015 | Boyle | H04N 5/23203 |
| 2008/0297601 | A1* | 12/2008 | Okada | H04N 5/232 348/159 |
| 2011/0115931 | A1* | 5/2011 | Kulinets | H04N 1/00251 348/211.2 |
| 2013/0194427 | A1* | 8/2013 | Hunter | H04N 7/188 348/157 |
| 2014/0092262 | A1* | 4/2014 | Otsuka | H04N 5/23222 348/207.1 |
| 2015/0022674 | A1* | 1/2015 | Blair | H04N 5/23222 348/207.1 |

FOREIGN PATENT DOCUMENTS

| | | | |
|---|---|---|---|
| JP | 2003-8973 | A | 1/2003 |
| JP | 2005-252465 | A | 9/2005 |

* cited by examiner

Fig. 2A
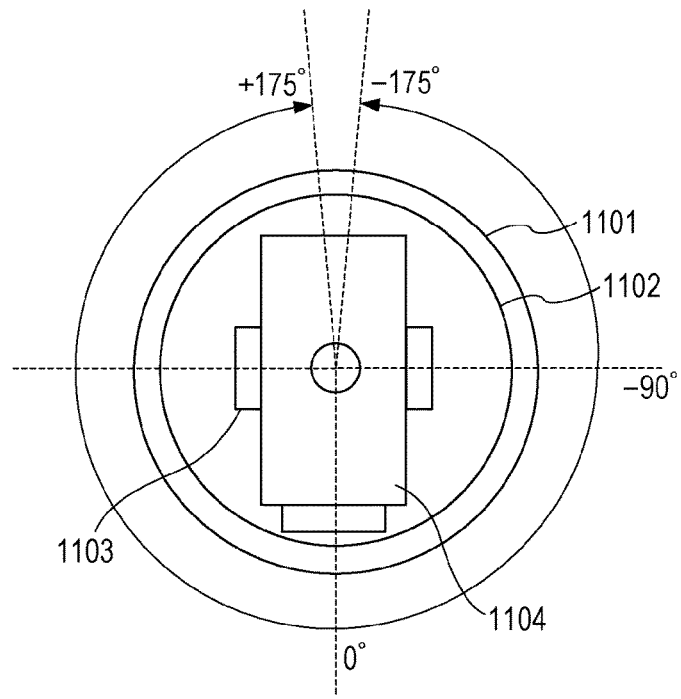
Fig. 2B
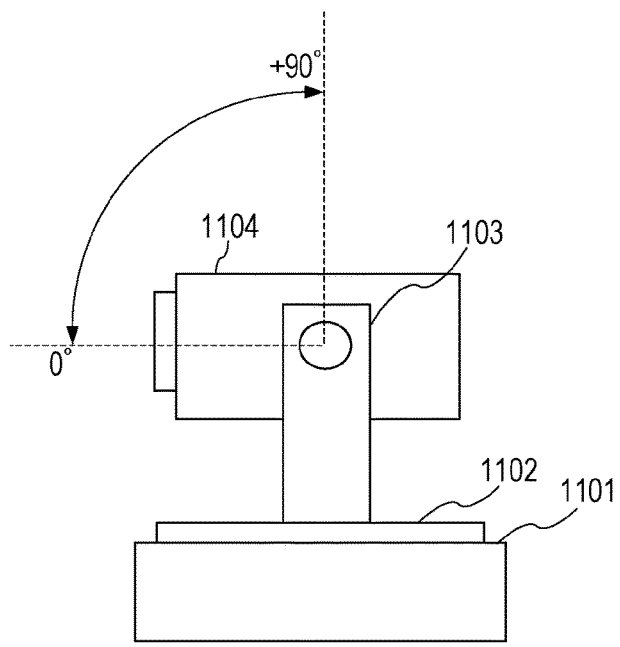
Fig. 3A
| DESTINATION ADDRESS | SOURCE ADDRESS | DIRECTION-DESIGNATING MOVING COMMAND ID | DIRECTION DESIGNATION (UPWARD/DOWNWARD/LEFTWARD/RIGHTWARD) |
|---|---|---|---|

Fig. 3B

| DESTINATION ADDRESS | SOURCE ADDRESS | STOP COMMAND ID | STOP DESIGNATION (PAN/TILT/PAN-TILT) |
|---|---|---|---|

Fig. 3C

| DESTINATION ADDRESS | SOURCE ADDRESS | STATUS ACQUISITION COMMAND ID |
|---|---|---|

Fig. 3D

| DESTINATION ADDRESS | SOURCE ADDRESS | STATUS ACQUISITION COMMAND RESPONSE ID | PRESENT PAN POSITION | PRESENT TILT POSITION | PAN-DRIVING-STATE FLAG (UNDER SUSPENSION/IN OPERATION) | TILT DRIVING STATE FLAG (UNDER SUSPENSION/IN OPERATION) |
|---|---|---|---|---|---|---|

Fig. 10A

```
<xs:element name="GetNode">
  <xs:complexType>
    <xs:sequence>
      <xs:element name="NodeToken" type="tt:ReferenceToken" />
    </xs:sequence>
  </xs:complexType>
</xs:element>
```

Fig. 10B

```
<xs:element name="GetNodeResponse">
  <xs:complexType>
    <xs:sequence>
      <xs:element name="PTZNode" type="tt:PTZNode" />
    </xs:sequence>
  </xs:complexType>
</xs:element>
```

Fig. 10C

```
<xs:complexType name="PTZNode">
  <xs:complexContent>
    <xs:extension base="tt:DeviceEntity">
      <xs:sequence>
        <xs:element name="Name" type="tt:Name" minOccurs="0"/>
        <xs:element name="SupportedPTZSpaces" type="tt:PTZSpaces"/>
        <xs:element name="MaximumNumberOfPresets" type="xs:int"/>
        <xs:element name="HomeSupported" type="xs:boolean"/>
        <xs:element name="AuxiliaryCommands" type="tt:AuxiliaryData" minOccurs="0" maxOccurs="unbounded"/>
        <xs:element name="Extension" type="tt:PTZNodeExtension" minOccurs="0" />
      </xs:sequence>
      <xs:attribute name="FixedHomePosition" type="xs:boolean"/>
    </xs:extension>
  </xs:complexContent>
</xs:complexType>
```

Fig. 11A

| DESTINATION ADDRESS | SOURCE ADDRESS | MINIMUM-DRIVING-AMOUNT SETTING COMMAND ID | MINIMUM PAN DRIVING AMOUNT | MINIMUM TILT DRIVING AMOUNT |
|---|---|---|---|---|

Fig. 11B

| DESTINATION ADDRESS | SOURCE ADDRESS | DIRECTION DESIGNATING COMMAND ID | DIRECTION DESIGNATING PARAMETER (UPWARD/DOWNWARD/LEFTWARD/RIGHTWARD) | MINIMUM PAN DRIVING AMOUNT | MINIMUM TILT DRIVING AMOUNT |
|---|---|---|---|---|---|

| DESTINATION ADDRESS | SOURCE ADDRESS | MINIMUM-DRIVING-AMOUNT-INFORMATION ACQUISITION COMMAND ID |
|---|---|---|

Fig. 13B

| DESTINATION ADDRESS | SOURCE ADDRESS | MINIMUM-DRIVING-AMOUNT-ENSURING-INFORMATION ACQUISITION RESPONSE ID | MINIMUM-DRIVING-AMOUNT ENSURING FUNCTION (AVAILABLE/UNAVAILABLE) |

Fig. 13C

| DESTINATION ADDRESS | SOURCE ADDRESS | MINIMUM-DRIVING-AMOUNT-ENSURING-INFORMATION ACQUISITION RESPONSE ID | UPPER LIMIT OF MINIMUM PAN DRIVING AMOUNT | LOWER LIMIT OF MINIMUM PAN DRIVING AMOUNT | UPPER LIMIT OF MINIMUM TILT DRIVING AMOUNT | LOWER LIMIT OF MINIMUM TILT DRIVING AMOUNT |

```
<xs:complexType name="PTZNodeExtension">
    <xs:sequence>
        <xs:element name="SupportedPresetTour" type="tt:PTZPresetTourSupported" />
        <xs:element name="Extension" type="tt:PTZNodeExtension2" minOccurs="0" />
    </xs:sequence>
</xs:complexType>
```

Fig. 15B

```
<xs:complexType name="PTZNodeExtension2">
    <xs:sequence>
        <xs:any namespace="SupportedMinimumMoveControl" type="tt:MicroMoveControlSupported" />
        <xs:element name="Extension" type="tt:PTZNodeExtension3" minOccurs="0" />
    </xs:sequence>
</xs:complexType>
```

Fig. 15C

```
<xs:complexType name="MinimumMoveControlSupported">
    <xs:sequence>
        <xs:element name="PanMinimumMove" type="tt:FloatRange" />
        <xs:element name="TiltMinimumMove" type="tt:FloatRange" />
        <xs:element name="Extension" type="tt:MinimumMoveControlSupportedExtension" minOccurs="0" />
    </xs:sequence>
</xs:complexType>
```

Fig. 15D

```
<xs:complexType name="FloatRange">
    <xs:sequence>
        <xs:element name="Min" type="xs:float"/>
        <xs:element name="Max" type="xs:float"/>
    </xs:sequence>
</xs:complexType>
```

IMAGE CAPTURING APPARATUS, EXTERNAL DEVICE, IMAGE CAPTURING SYSTEM, METHOD FOR CONTROLLING IMAGE CAPTURING APPARATUS, METHOD FOR CONTROLLING EXTERNAL DEVICE, METHOD FOR CONTROLLING IMAGE CAPTURING SYSTEM, AND PROGRAM

TECHNICAL FIELD

The present invention relates to an image capturing apparatus, an external device, an image capturing system, a method for controlling the image capturing apparatus, a method for controlling the external device, a method for controlling the image capturing system, and a program. In particular, the present invention is suitable for use in rotating an image capturing unit in a predetermined direction.

BACKGROUND ART

Network cameras are known in the related art which are controlled by remote control through a network or an exclusive line to monitor a predetermined monitoring area. Some of such network cameras include a driving unit for panning (rotating in a horizontal direction) and tilting (rotating in a vertical direction) an image capturing unit for capturing an image of a subject to move the image capture direction.

Network cameras are operated in accordance with commands transmitted from an external device connected over a network. Users transmit a driving command for a rightward or leftward panning motion, an upward or downward tilting motion, or a panning and tilting motion, which is a combination thereof, to the network camera by operating the external device.

This allows the users to move the image capturing unit of the network camera in a desired rotational direction and to stop the image capturing unit at a given position by transmitting a stop command while viewing an image during movement. In this way, the users operate the network camera in a desired image capture direction, thereby capturing an image of a target area.

PTL 1 discloses an image capturing apparatus in which the image capture direction can be changed by operating a pan head by key operation on a mobile phone having a browser function or a mouse operation on a personal computer.

However, with the related art disclosed in PTL 1, it is sometimes difficult to move the image capture direction of the network camera by a minute amount.

In general, a time delay occurs between the time a network camera receives a driving command for a panning and tilting motion of an image capturing unit and the time an image capturing unit actually starts to operate due to a waiting time in control processing, the characteristics of a power transmission system of the image capturing unit, and so on.

For example, assume a case in which an image capturing unit is moved by a minute amount for fine adjustment of the image capturing direction of a network camera. Under such assumption, the user transmits a stop command for stopping a panning or tilting motion of the image capturing unit to the network camera immediately after transmitting a driving command for the panning and tilting motion without a time difference.

At that time, the driving command is sometimes cancelled because the stop command received during the time delay between the time the network camera receives the driving command and the time the image capturing unit actually starts to operate is executed. Thus, the image capturing unit of the network camera sometimes terminates the process without starting operation.

In the case where the stop command is transmitted after the driving command is transmitted and the user visually confirms that the image capturing unit has started to operate, the stop timing of the image capturing unit is sometimes delayed due to the time delay between the execution times of the individual commands. Because of this, the stop position of the image capturing unit sometimes passes through a user's intended position.

CITATION LIST

Patent Literature

PTL 1: Japanese Patent Laid-Open No. 2003-8973

SUMMARY OF INVENTION

The present invention is made in view of the above problems. In other words, users can easily and reliably stop an image capturing unit at a user's intended position using a command for starting to change the position of the image capturing unit and a command for stopping the change.

SOLUTION TO PROBLEM

According to an aspect of the present invention, an image capturing apparatus that communicates with an external device includes a field-of-view changing unit configured to change a field of view for capturing an image of a subject, a receiving unit configured to receive, from the external device, a command for controlling the field-of-view changing unit, a control unit configured to control, when the receiving unit receives a command to start to change a field of view using the field-of-view changing unit, the field-of-view changing unit to start to change the field of view and an amount-of-change determination unit configured to determine an amount of change in the field of view using the field-of-view changing unit, wherein the control unit controls the field-of-view changing unit such that the amount of change in the field of view determined by the amount-of-change determination unit becomes a predetermined amount or more irrespective of whether the receiving unit receives a command to stop changing the field of view using the field-of-view changing unit.

Further features of the present invention will become apparent from the following description of exemplary embodiments with reference to the attached drawings.

BRIEF DESCRIPTION OF DRAWINGS

FIG. 2A is a top view of the network camera according to the first embodiment of the present invention.

FIG. 2B is a side view of the network camera.

FIG. 3A is a diagram for explaining an example of a command transmitted from the client device to the network camera according to the first embodiment of the present invention.

FIG. 3B is a diagram for explaining an example of a command transmitted from the client device to the network camera according to the first embodiment of the present invention.

FIG. 3C is a diagram for explaining an example of a command transmitted from the client device to the network camera according to the first embodiment of the present invention.

FIG. 3D is a diagram for explaining an example of a command response transmitted from the network camera to the client device according to the first embodiment of the present invention.

FIG. 10A is a diagram of a definition example of a command according to the first embodiment of the present invention.

FIG. 10B is a diagram of a definition example of a command according to the first embodiment of the present invention.

FIG. 10C is a diagram of a definition example of a command according to the first embodiment of the present invention.

FIG. 11A is a diagram for explaining an example of a command transmitted from the client device to the network camera according to a second embodiment of the present invention.

FIG. 11B is a diagram for explaining an example of a command transmitted from the client device to the network camera according to the second embodiment of the present invention.

FIG. 13B is a diagram for explaining a response that the network camera returns to the client device according to the third embodiment of the present invention.

FIG. 13C is a diagram for explaining a response that the network camera returns to the client device according to the third embodiment of the present invention.

FIG. 15B is a diagram showing a definition example of a command according to the third embodiment of the present invention.

FIG. 15C is a diagram showing a definition example of a command according to the third embodiment of the present invention.

FIG. 15D is a diagram showing a definition example of a command according to the third embodiment of the present invention.

DESCRIPTION OF EMBODIMENTS

Embodiments of the present invention will be described in detail hereinbelow with reference to the attached drawings. The configurations in the following embodiments are given for mere illustration and are not intended to limit the present invention.

First Embodiment

Figure 1:
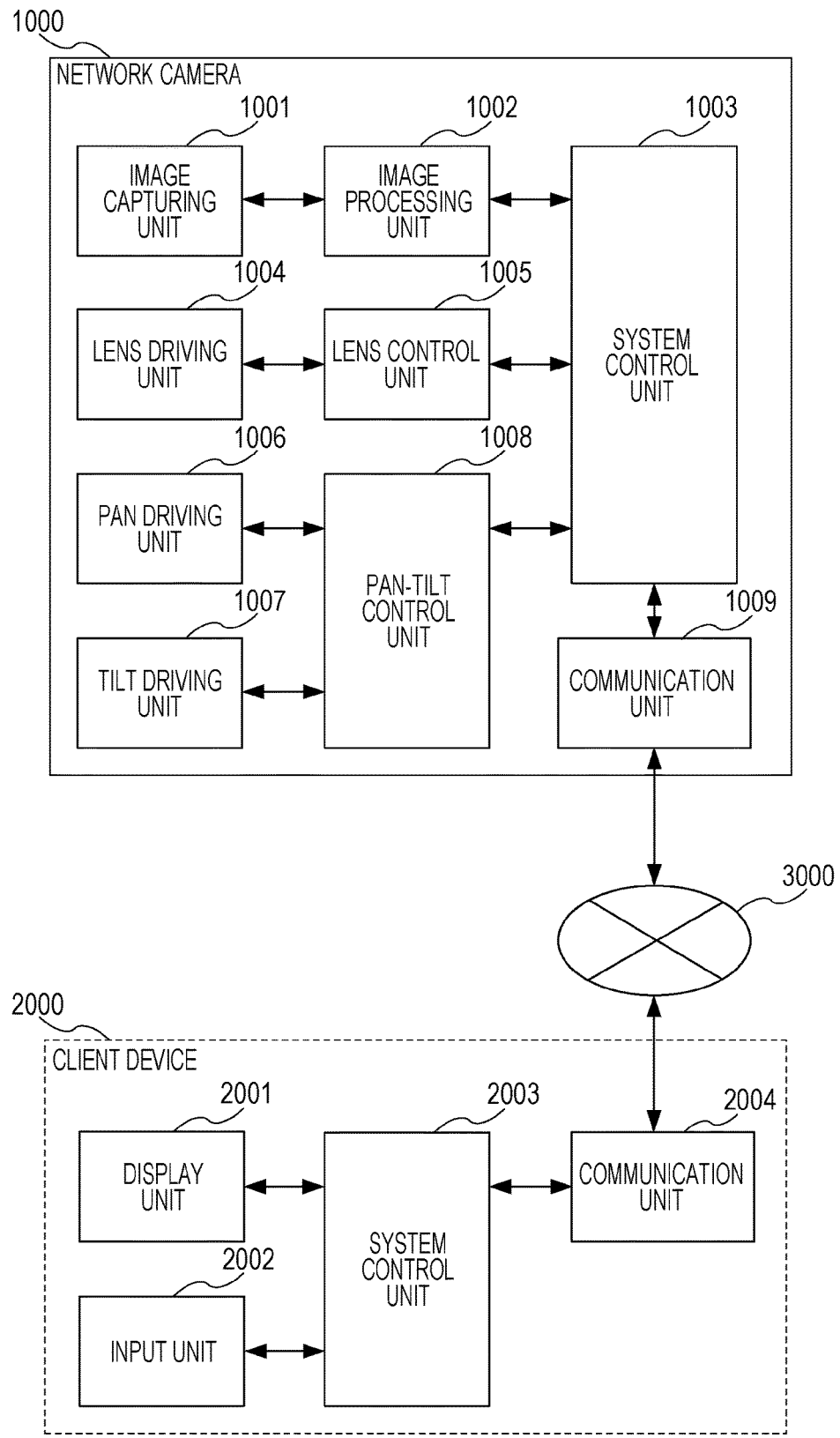
FIG. 1 is a diagram showing examples of the hardware configurations of a network camera and a client device according to a first embodiment of the present invention.

Referring to FIG. 1, examples of the hardware configurations of a network camera 1000 and a client device 2000 according to a first embodiment will be described. The network camera 1000 in FIG. 1 is connected to the client device 2000 through a network 3000 (via a network) so as to communicate with each other.

The network camera 1000 of this embodiment corresponds to a monitoring camera that captures a moving image for use in monitoring. The client device 2000 of this embodiment is an example of an external device. The network camera 1000 and the client device 2000 of this embodiment constitute an image capturing system (a monitoring system).

The network camera 1000 in FIG. 1 includes an image capturing unit 1001. The image capturing unit 1001 includes lenses, such as a focus lens and a zoom lens (not shown), and an image sensor, such as a CCD or a CMOS.

The image capturing unit 1001 generates an analog signal by capturing an image of a subject formed with the lens. The image capturing unit 1001 converts the generated analog signal to digital data. In other words, the image capturing unit 1001 converts the analog signal generated by capturing an image of the subject to digital data.

An image processing unit 1002 performs predetermined image processing on the digital data output from the image capturing unit 1001. Subsequently, the image processing unit 1002 performs a compression coding process on the digital data subjected to the predetermined image processing on the basis of a compression coding format, such as JPEG, H.264, or H.265. The image processing unit 1002 outputs the digital data subjected to the compression coding process in the form of image data to a communication unit 1009 via a system control unit 1003.

The communication unit 1009 receives the image data output from the image processing unit 1002 via the system control unit 1003. The communication unit 1009 transmits the received image data to the client device 2000 through the network 3000. The communication unit 1009 receives a camera control command transmitted from the client device 2000 through the network 3000.

The communication unit 1009 outputs the received camera control command to the system control unit 1003. The communication unit 1009 transmits a response to the received camera control command to the client device 2000 through the network 3000 in accordance with an instruction from the system control unit 1003.

The system control unit 1003 controls the components of the network camera 1000 as a whole. An example of the system control unit 1003 is a central processing unit (CPU). The system control unit 1003 accommodates a storage unit, such as a memory.

The system control unit 1003 executes programs stored in the storage unit. The system control unit 1003 may performs the control using hardware. The system control unit 1003 performs a process corresponding to a camera control command output from the communication unit 1009 by analyzing the camera control command.

For example, the system control unit 1003 instructs the image processing unit 1002 to control the image quality of the digital data output from the image capturing unit 1001. The system control unit 1003 instructs a lens control unit 1005 to control zooming or focusing. The system control unit 1003 instructs a pan-tilt control unit 1008 to control a pan driving unit 1006 and a tilt driving unit 1007.

The system control unit 1003 accommodates a timer for counting time and uses it for timing in a status monitoring process, described later.

The lens control unit 1005 controls a lens driving unit 1004 in accordance with an instruction from the system control unit 1003. The lens driving unit 1004 includes driving mechanisms and driving sources for the focus lens and the zoom lens individually. The focus lens and the zoom lens are included in the image capturing unit 1001. The driving sources of the lens driving unit 1004 are stepping motors or the like.

The pan-tilt control unit 1008 controls the pan driving unit 1006 and the tilt driving unit 1007 in accordance with an instruction from the system control unit 1003. The pan driving unit 1006 includes a mechanical drive mechanism and a driving source for rotating the image capturing unit 1001 in a pan direction. The tilt driving unit 1007 includes a mechanical drive mechanism and a driving source for rotating the image capturing unit 1001 in a tilt direction.

The driving sources of the pan driving unit 1006 and the tilt driving unit 1007 are stepping motors or the like. The pan driving unit 1006 and the tilt driving unit 1007 in this embodiment correspond to field-of-view changing units for changing the field of view for capturing an image of a subject.

A typical example of the client device 2000 in FIGS. 2A and 2B is a general purpose computer, such as a personal computer. A communication unit 2004 receives image data transmitted from the network camera 1000 through the network 3000. The communication unit 2004 outputs the received image data to a system control unit 2003.

The communication unit 2004 transmits a camera control command to the network camera 1000 through the network 3000 in accordance with an instruction from the system control unit 2003. The communication unit 2004 receives a response to the camera control command from the network camera 1000 through the network 3000. Subsequently, the communication unit 2004 outputs the received response to the system control unit 2003.

A display unit 2001 is a liquid crystal display or the like. The display unit 2001 displays an image corresponding to the image data output from the system control unit 2003. The display unit 2001 further displays a graphic user interface (hereinafter, sometimes referred to as a GUI) for controlling the network camera 1000.

An input unit 2002 includes a keyboard and a pointing device, such as a mouse. The user of the client device 2000 operates a GUI displayed on the display unit 2001 via the input unit 2002.

The system control unit 2003 controls the entire client device 2000. An example of the system control unit 2003 is a CPU. The system control unit 2003 accommodates a storage unit, such as a memory. The system control unit 2003 executes programs stored in the storage unit. Alternatively, the system control unit 2003 may perform the control using hardware.

The system control unit 2003 generates a camera control command in accordance with user's GUI operation. The system control unit 2003 instructs the communication unit 2004 to transmit the generated camera control command to the network camera 1000 through the network 3000. Furthermore, the system control unit 2003 instructs the display unit 2001 to display the image data from the network camera 1000 received by the communication unit 2004 on the display unit 2001.

In this way, the client device 2000 can obtain image data from the network camera 1000 through the network 3000 and perform various kinds of camera control.

The network 3000 includes a plurality of routers, switches, and cables that satisfy communication standards, such as Ethernet (a registered trademark). However, this embodiment may use any communication standard, scale, and configuration that enable communication between the network camera 1000 and the client device 2000.

For example, the network 3000 may be the Internet, a wired local area network (LAN), a wireless LAN, or a wide area network (WAN). The network camera 1000 in this embodiment may support Power Over Ethernet (PoE) (a registered trademark) and may be supplied with power over a LAN cable.

FIGS. 2A and 2B are a top view and a side view of the network camera 1000 according to this embodiment, respectively. More specifically, FIG. 2A is a top view of the network camera 1000, and FIG. 2B is a side view of the network camera 1000.

In FIGS. 2A and 2B, a bottom case 1101 supports a turntable 1102 so as to be rotatable in a pan direction. The turntable 1102 supports a camera head support 1103. The camera head support 1103 supports a camera head 1104 to as to be rotatable in a tilt direction.

In this embodiment, the bottom case 1101 and the turntable 1102 constitute a pan rotating unit. In this embodiment, the camera head support 1103 and the camera head 1104 constitute a tilt rotating unit.

The range of rotation of the camera head 1104 in the pan direction in this embodiment is from −175 degrees to the left to +175 degrees to the right centered at 0 degree. The range of rotation of the camera head 104 in the tilt direction in this embodiment is from 0 degree to 90 degrees, with the horizontal direction at 0 degree.

Since the network camera 1000 of this embodiment can change the image capture direction by rotating the camera head 1104 in the pan direction and the tilt direction as described above, an image of a wide area can be captured.

FIGS. 3A to 3C are diagrams illustrating commands that the client device 2000 provides to the network camera 1000, and FIG. 3D is a diagram illustrating a response that the network camera 1000 provides to the client device 2000.

As shown in FIGS. 3A to 3C, the command requests each include information on a destination address indicating the address of the network camera 1000, which is a target of the commands, and information on the source address of the client device 2000, which is the source of the commands.

As shown in FIG. 3D, the command response includes information on a destination address indicating the address of the client device 2000, which is a target to which the result of the command is returned, and information on the source address of the network camera 1000, which is the source of the result. The commands each further include information on the details of the command and a parameter.

FIG. 3A shows a direction-designating moving command for starting to change the image capture direction of the network camera 1000. Direction-designating moving command ID in the direction-designating moving command is an ID for identifying the direction-designating moving command. Direction designation (information) in the direction-designating moving command indicates one of upward, downward, leftward, and rightward.

With this command, the client device 2000 can freely change the image capture direction of the network camera 1000. The direction-designating moving command ID and the direction designation correspond to parameters of the direction-designating moving command.

In this embodiment, a direction-designating moving command in which direction designation information indicating leftward or rightward movement is specified as a parameter corresponds to a start command for stating movement of the image capturing unit 1001 in the pan direction. In this embodiment, a direction-designating moving command in which direction designation information indicating upward or downward movement is specified as a parameter corresponds to a start command for starting movement of the image capturing unit 1001 in the tilt direction.

FIG. 3B shows a stop command for stopping a change in the image capture direction of the network camera 1000. Stop command ID in the stop command is an ID for identifying the stop command. Stop designation (information) in the stop command indicates one of pan, tilt, and pan-tilt.

With this command, the client device 2000 can stop the movement of the image capturing unit 1001 of the network camera 1000 in the pan direction or the tilt direction. The stop command ID and the stop designation correspond to parameters of the stop command. In this embodiment, a stop command in which a pan stop designation is specified as a parameter corresponds to a command for stopping the movement of the image capturing unit 1001 in the pan direction.

In this embodiment, a stop command in which a tilt stop designation is specified as a parameter corresponds to a command for stopping the movement of the image capturing unit 1001 in the tilt direction. In this embodiment, a stop command in which a pan-tilt stop designation is specified as a parameter corresponds to a command for stopping the movement of the image capturing unit 1001 in the pan direction and the tilt direction.

FIG. 3C is a status acquisition command for determining the present image capture direction of the network camera 1000 and whether or not the image capture direction has been changed at present. Status acquisition command ID in the status acquisition command is an ID for identifying the status acquisition command.

With this command, the client device 2000 can obtain the present position of the image capturing unit 1001 of the network camera 1000 in the pan direction and the tilt direction. This command also allows the client device 2000 to obtain the present driving state of the image capturing unit 1001 in the pan direction and the tilt direction.

By "the present driving state in the pan direction, it is meant whether the image capturing unit 1001 is driven in the pan direction or is stopped at present. By "the present driving state in the tilt direction", it is meant whether the image capturing unit 1001 is driven in the tilt direction or is stopped at present.

FIG. 3D shows a response to the status acquisition command shown in FIG. 3C. This response is transmitted from the network camera 1000 to the client device 2000. Status acquisition response ID in the status acquisition response is an identifier for identifying the status acquisition response.

Present pan position in the status acquisition response is information indicating the present position of the image capturing unit 1001 in the pan direction. Present tilt position in the status acquisition response is information indicating the present position of the image capturing unit 1001 in the tilt direction.

Pan-driving-state flag in the status acquisition response is information indicating whether the image capturing unit 1001 is in operation or under suspension in the pan direction. Tilt-driving-state flag in the status acquisition response is information indicating whether the image capturing unit 1001 is in operation or under suspension in the tilt direction.

With this response, the client device 2000 can obtain the present position of the image capturing unit 1001 in the pan direction and the tilt direction. This response further allows the client device 2000 to determine whether the image capturing unit 1001 is in operation or under suspension in the pan direction and the tilt direction.

Figure 4:
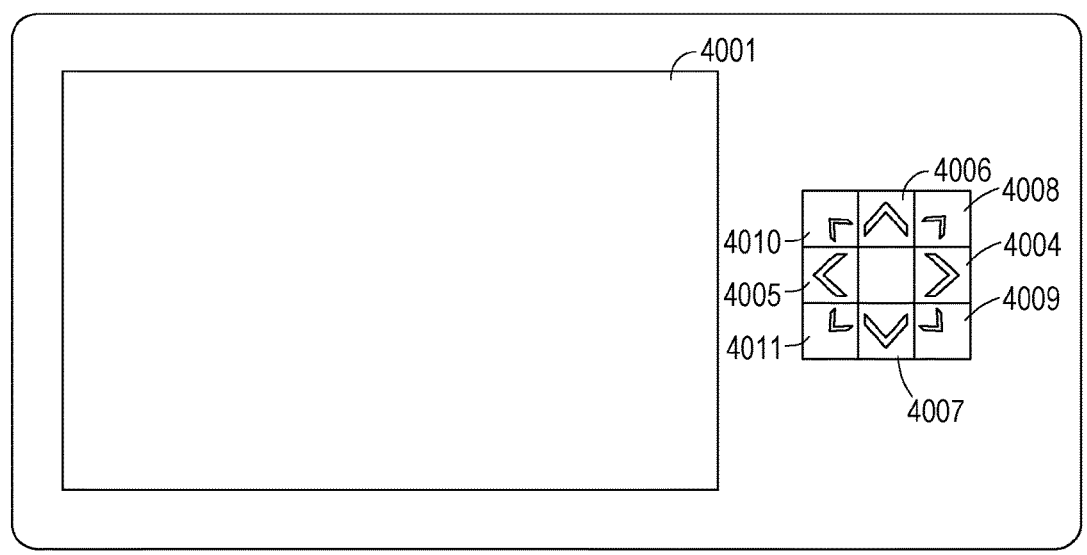
FIG. 4 is a diagram showing an example of a camera control application screen according to the first embodiment of the present invention.

FIG. 4 shows an example of a camera control application screen, which is a GUI of a camera control application of the client device 2000 in this embodiment. This screen is displayed on the display unit 2001 by the system control unit 2003. The user of the client device 2000 operates this screen using the input unit 2002.

An image display section 4001 in FIG. 4 displays an image corresponding to image data received from the network camera 1000.

The system control unit 2003 determines whether a rightward moving button 4004 is pressed by the user. When the system control unit 2003 determines that the rightward moving button 4004 is pressed by the user, the system control unit 2003 generates a direction-designating moving command in which a rightward direction designation is specified as a parameter.

Subsequently, the system control unit 2003 instructs the communication unit 2004 to transmit the generated direction-designating moving command to the network camera 1000. When the system control unit 2003 determines that the rightward moving button 4004 is not pressed by the user, the system control unit 2003 performs no particular process.

If the system control unit 2003 determines that the rightward moving button 4004 is pressed by the user, then the system control unit 2003 determines whether the user has stopped pressing the rightward moving button 4004. If the system control unit 2003 determines that the user has stopped pressing the rightward moving button 4004, the system control unit 2003 instructs the communication unit 2004 to transmit a stop command in which a pan stop designation is specified as a parameter to the network camera 1000.

Furthermore, the system control unit 2003 determines whether a leftward moving button 4005 is pressed by the user. If the system control unit 2003 determines that the leftward moving button 4005 is pressed by the user, the system control unit 2003 generates a direction-designating moving command in which a leftward direction designation is specified as a parameter.

Subsequently, the system control unit 2003 instructs the communication unit 2004 to transmit the generated direction-designating moving command to the network camera 1000. If the system control unit 2003 determines that the leftward moving button 4005 is not pressed by the user, the system control unit 2003 performs no particular process.

If the system control unit 2003 determines that the leftward moving button 4005 is pressed by the user, then the system control unit 2003 determines whether the user has stopped pressing the leftward moving button 4005. If the system control unit 2003 determines that the user has stopped pressing the leftward moving button 4005, the system control unit 2003 instructs the communication unit 2004 to transmit a stop command in which a pan stop designation is specified as a parameter to the network camera 1000.

Furthermore, the system control unit 2003 determines whether an upward moving button 4006 is pressed by the user. If the system control unit 2003 determines that the upward moving button 4006 is pressed by the user, the system control unit 2003 generates a direction-designating moving command in which an upward direction designation is specified as a parameter.

Subsequently, the system control unit 2003 instructs the communication unit 2004 to transmit the generated direction-designating moving command to the network camera 1000. If the system control unit 2003 determines that the upward moving button 4006 is not pressed by the user, the system control unit 2003 performs no particular process.

If the system control unit 2003 determines that the upward moving button 4006 is pressed by the user, then the system control unit 2003 determines whether the user has stopped pressing the upward moving button 4006.

If the system control unit 2003 determines that the user has stopped pressing the upward moving button 4006, the system control unit 2003 instructs the communication unit 2004 to transmit a stop command in which a tilt stop designation is specified as a parameter to the network camera 1000.

Furthermore, the system control unit 2003 determines whether a downward moving button 4007 is pressed by the user. If the system control unit 2003 determines that the downward moving button 4007 is pressed by the user, the system control unit 2003 generates a direction-designating moving command in which a downward direction designation is specified as a parameter.

Subsequently, the system control unit 2003 instructs the communication unit 2004 to transmit the generated direction-designating moving command to the network camera 1000. If the system control unit 2003 determines that the downward moving button 4007 is not pressed by the user, the system control unit 2003 performs no particular process.

If the system control unit 2003 determines that the downward moving button 4007 is pressed by the user, then the system control unit 2003 determines whether the user has stopped pressing the downward moving button 4007.

If the system control unit 2003 determines that the user has stopped pressing the downward moving button 4007, the system control unit 2003 instructs the communication unit 2004 to transmit a stop command in which a tilt stop designation is specified as a parameter to the network camera 1000.

Furthermore, the system control unit 2003 determines whether an upper-rightward moving button 4008 is pressed by the user. If the system control unit 2003 determines that the upper-rightward moving button 4008 is pressed by the user, the system control unit 2003 generates a direction-designating moving command in which a rightward direction designation is specified as a parameter and a direction-designating moving command in which an upward direction designation is specified as a parameter.

Subsequently, the system control unit 2003 instructs the communication unit 2004 to transmit the generated direction-designating moving commands to the network camera 1000. If the system control unit 2003 determines that the upper-rightward moving button 4008 is not pressed by the user, the system control unit 2003 performs no particular process.

If the system control unit 2003 determines that the upper-rightward moving button 4008 is pressed by the user, then the system control unit 2003 determines whether the user has stopped pressing the upper-rightward moving button 4008.

If the system control unit 2003 determines that the user has stopped pressing the upper-rightward moving button 4008, the system control unit 2003 instructs the communication unit 2004 to transmit a stop command in which a pan-tilt stop designation is specified as a parameter to the network camera 1000.

Furthermore, the system control unit 2003 determines whether a lower-rightward moving button 4009 is pressed by the user. If the system control unit 2003 determines that the lower-rightward moving button 4009 is pressed by the user, the system control unit 2003 generates a direction-designating moving command in which a rightward direction designation is specified as a parameter and a direction-designating moving command in which a downward direction designation is specified as a parameter.

Subsequently, the system control unit 2003 instructs the communication unit 2004 to transmit the generated direction-designating moving commands to the network camera 1000. If the system control unit 2003 determines that the lower-rightward moving button 4009 is not pressed by the user, the system control unit 2003 performs no particular process.

If the system control unit 2003 determines that the user has stopped pressing the lower-rightward moving button 4009, then the system control unit 2003 determines whether the user has stopped pressing the lower-rightward moving button 4009.

If the system control unit 2003 determines that the user has stopped pressing the lower-rightward moving button 4009, the system control unit 2003 instructs the communication unit 2004 to transmit a stop command in which a pan-tilt stop designation is specified as a parameter to the network camera 1000.

Furthermore, the system control unit 2003 determines whether an upper-leftward moving button 4010 is pressed by the user. If the system control unit 2003 determines that the upper-leftward moving button 4010 is pressed by the user, the system control unit 2003 generates a direction-designating moving command in which a leftward direction designation is specified as a parameter and a direction-designating moving command in which an upward direction designation is specified as a parameter.

Subsequently, the system control unit 2003 instructs the communication unit 2004 to transmit the generated direction-designating moving commands to the network camera 1000. If the system control unit 2003 determines that the upper-leftward moving button 4010 is not pressed by the user, the system control unit 2003 performs no particular process.

Furthermore, if the system control unit 2003 determines that the upper-leftward moving button 4010 is pressed by the user, then the system control unit 2003 determines whether the user has stopped pressing the upper-leftward moving button 4010.

If the system control unit 2003 determines that the user has stopped pressing the upper-leftward moving button 4010, the system control unit 2003 instructs the communication unit 2004 to transmit a stop command in which a pan-tilt stop designation is specified as a parameter to the network camera 1000.

Furthermore, the system control unit 2003 determines whether a lower-leftward moving button 4011 is pressed by the user. If the system control unit 2003 determines that the lower-leftward moving button 4011 is pressed by the user, the system control unit 2003 generates a direction-designating moving command in which a leftward direction designation is specified as a parameter and a direction-designating moving command in which a downward direction designation is specified as a parameter.

Subsequently, the system control unit 2003 instructs the communication unit 2004 to transmit the generated direction-designating moving commands to the network camera 1000. If the system control unit 2003 determines that the lower-leftward moving button 4011 is not pressed by the user, the system control unit 2003 performs no particular process.

If the system control unit 2003 determines that the lower-leftward moving button 4011 is pressed by the user, then the system control unit 2003 determines whether the user has stopped pressing the lower-leftward moving button 4011.

If the system control unit 2003 determines that the user has stopped pressing the lower-leftward moving button 4011, the system control unit 2003 instructs the communication unit 2004 to transmit a stop command in which a pan-tilt stop designation is specified as a parameter to the network camera 1000.

Thus, the user can change the image capture direction of the network camera 1000 by operating the buttons 4004 to 4011 depending on the target area and the movement of the subject while monitoring an image displayed on the image display section 4001.

In this embodiment, when the system control unit 2003 determines that the rightward moving button 4004 or the like is pressed by the user, the system control unit 2003 may transmit a direction-designating moving command and may start timing with a timer accommodated in the system control unit 2003.

If the system control unit 2003 of this embodiment determines that the user has stopped pressing the rightward moving button 4004 or the like, then the system control unit 2003 may determine whether the time measured by the timer accommodated in the system control unit 2003 is a predetermined time or longer.

If the system control unit 2003 of this embodiment determines that the time measured by the timer accommodated in the system control unit 2003 is a predetermined time or longer, then the system control unit 2003 may instruct the communication unit 2004 to transmit a stop command to the network camera 1000.

Furthermore, if the system control unit 2003 of this embodiment determines that the time measured by the timer is not the predetermined time or longer, the system control unit 2003 may transmit a stop command to the network camera 1000 after the time measured by the timer becomes the predetermined time or longer.

Figure 5:
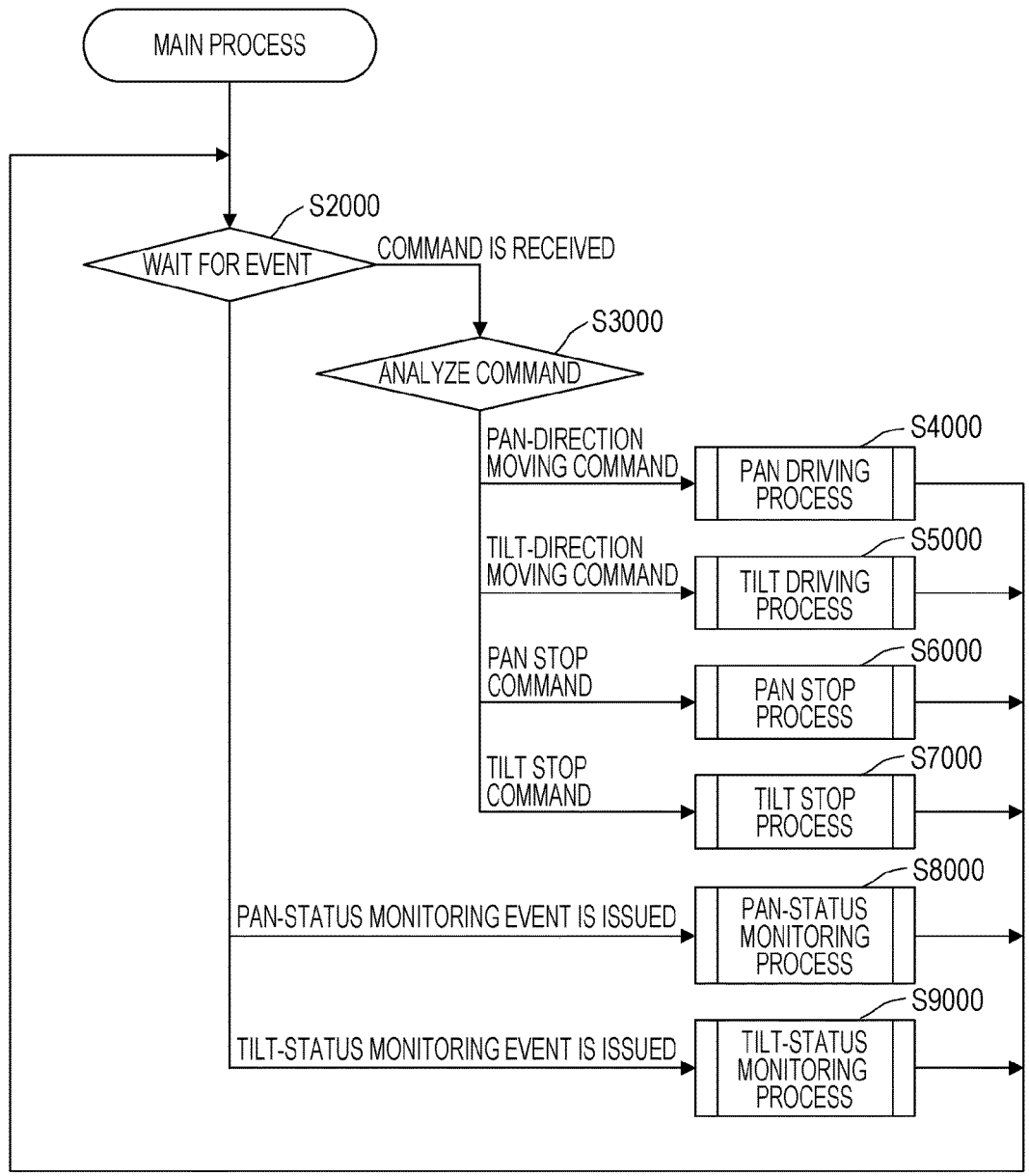
FIG. 5 is a flowchart for explaining a main process according to the first embodiment of the present invention.

FIG. 5 is a flowchart for explaining the main process of the network camera 1000 according to this embodiment. This process is executed by the system control unit 1003.

In step S2000 in FIG. 5, the system control unit 1003 goes to an event waiting state. In the event waiting state, the system control unit 1003 waits for an event issued in response to a command received by the communication unit 1009 or an event issued in response to timer time-out and performs a process corresponding to the issued event.

For example, the system control unit 1003 determines whether the communication unit 1009 has received a command from the network camera 1000. If the system control unit 1003 determines that the communication unit 1009 has received the command from the network camera 1000, the system control unit 1003 goes to step S3000.

In contrast, if the system control unit 1003 determines that the communication unit 1009 has not received a command from the network camera 1000, the system control unit 1003 determines whether a pan-status monitoring event, described later, has been issued. If the system control unit 1003 determines that the pan-status monitoring event has been issued, the system control unit 1003 goes to step S8000.

In contrast, if the system control unit 1003 determines that the pan-status monitoring event has not been issued, the system control unit 1003 determines whether a tilt-status monitoring event, described later, has been issued. If the system control unit 1003 determines that the tilt-status monitoring event has been issued, the system control unit 1003 goes to step S9000. In contrast, if the system control unit 1003 determines that the tilt-status monitoring event has not been issued, the system control unit 1003 returns to step S2000.

In step S3000, the system control unit 1003 analyzes the command that the communication unit 1009 has received from the network camera 1000. Specifically, the system control unit 1003 determines whether the command that the communication unit 1009 has received is a direction-designating moving command in which a leftward or rightward direction designation is a parameter.

If the system control unit 1003 determines that the command that the communication unit 1009 has received is a direction-designating moving command in which a leftward or rightward direction designation is a parameter, the system control unit 1003 goes to step S4000.

In contrast, if the system control unit 1003 determines that the command is not a direction-designating moving command in which a leftward or rightward direction designation is a parameter, then the system control unit 1003 determines whether the command that the communication unit 1009 has received is a direction-designating moving command in which an upward or downward direction designation is a parameter.

If the system control unit 1003 determines that the command that the communication unit 1009 has received is a direction-designating moving command in which an upward or downward direction designation is a parameter, the system control unit 1003 goes to step S5000.

In contrast, if the system control unit 1003 determines that the command that the communication unit 1009 has received is not a direction-designating moving command in which an upward or downward designation is a parameter, then the system control unit 1003 determines whether the command is a stop command in which a pan stop designation is a parameter. If the system control unit 1003 determines that the command that the communication unit 1009 has received is a stop command in which a pan stop designation is a parameter, the system control unit 1003 goes to step S6000.

In contrast, if the system control unit 1003 determines that the command that the communication unit 1009 has received is not a stop command in which a pan stop designation is a parameter, the system control unit 1003 determines whether the command is a stop command in which a tilt stop designation is a parameter. If the system control unit 1003 determines that the command is a stop command in which a tilt stop designation is a parameter, the system control unit 1003 goes to step S7000.

When a direction-designating moving command is received by the communication unit 1009, the system control unit 1003 of this embodiment serves as a stop-command determination unit that determines whether a stop command has been received by the communication unit 1009.

In step S4000, the system control unit 1003 executes a pan driving process.

In step S5000, the system control unit 1003 executes a tilt driving process.

The pan driving process and the tilt driving process will be described later with reference to FIG. 6.

In step S6000, the system control unit 1003 executes a pan stop process.

In step S7000, the system control unit 1003 executes a tilt stop process.

The pan stop process and the tilt stop process will be described later with reference to FIG. 7.

In step S8000, the system control unit 1003 executes a pan-status monitoring process.

In step S9000, the system control unit 1003 executes a tilt-status monitoring process.

The pan-status monitoring process and the tilt-status monitoring process will be described later with reference to FIG. 8.

Figure 6:
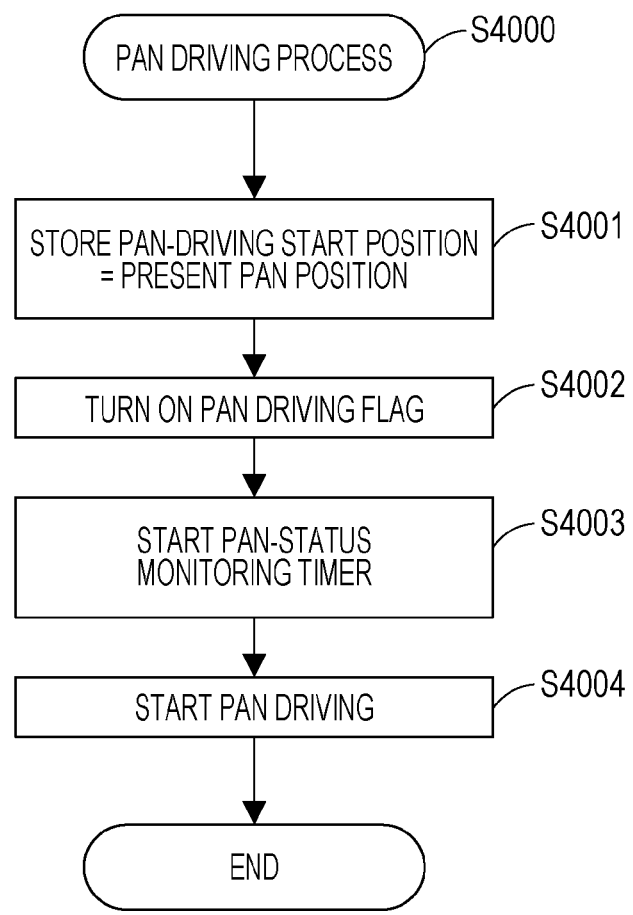
FIG. 6 is a flowchart for explaining a pan driving process according to the first embodiment of the present invention.

FIG. 6 is a flowchart for explaining the pan driving process performed by the network camera 1000 of this embodiment. The process is executed by the system control unit 1003.

In step S4001 in FIG. 6, the system control unit 1003 causes the storage unit in the system control unit 1003 to store the present position of the image capturing unit 1001 in the pan direction as a pan-driving start position.

In step S4002, the system control unit 1003 turns on the value of a pan driving flag stored in the storage unit in the system control unit 1003.

In step S4003, the system control unit 1003 instructs a pan-status monitoring timer accommodated in the system control unit 1003 to start time measurement. After the starting, the pan-status monitoring timer issues a pan-status monitoring event every lapse of a predetermined time (predetermined intervals), for example, 33 mm/sec.

In step S4004, the system control unit 1003 instructs the pan-tilt control unit 1008 to control the pan driving unit 1006 so that the image capturing unit 1001 rotates in a direction designated by a direction designation indicated by the parameter of the direction-designating moving command that the communication unit 1009 has received.

Since the tilt driving process in step S5000, described above, is a process in which "pan" in the pan driving process is replaced with "tilt", and is similar to the pan driving process, a description thereof will be omitted.

Figure 7:
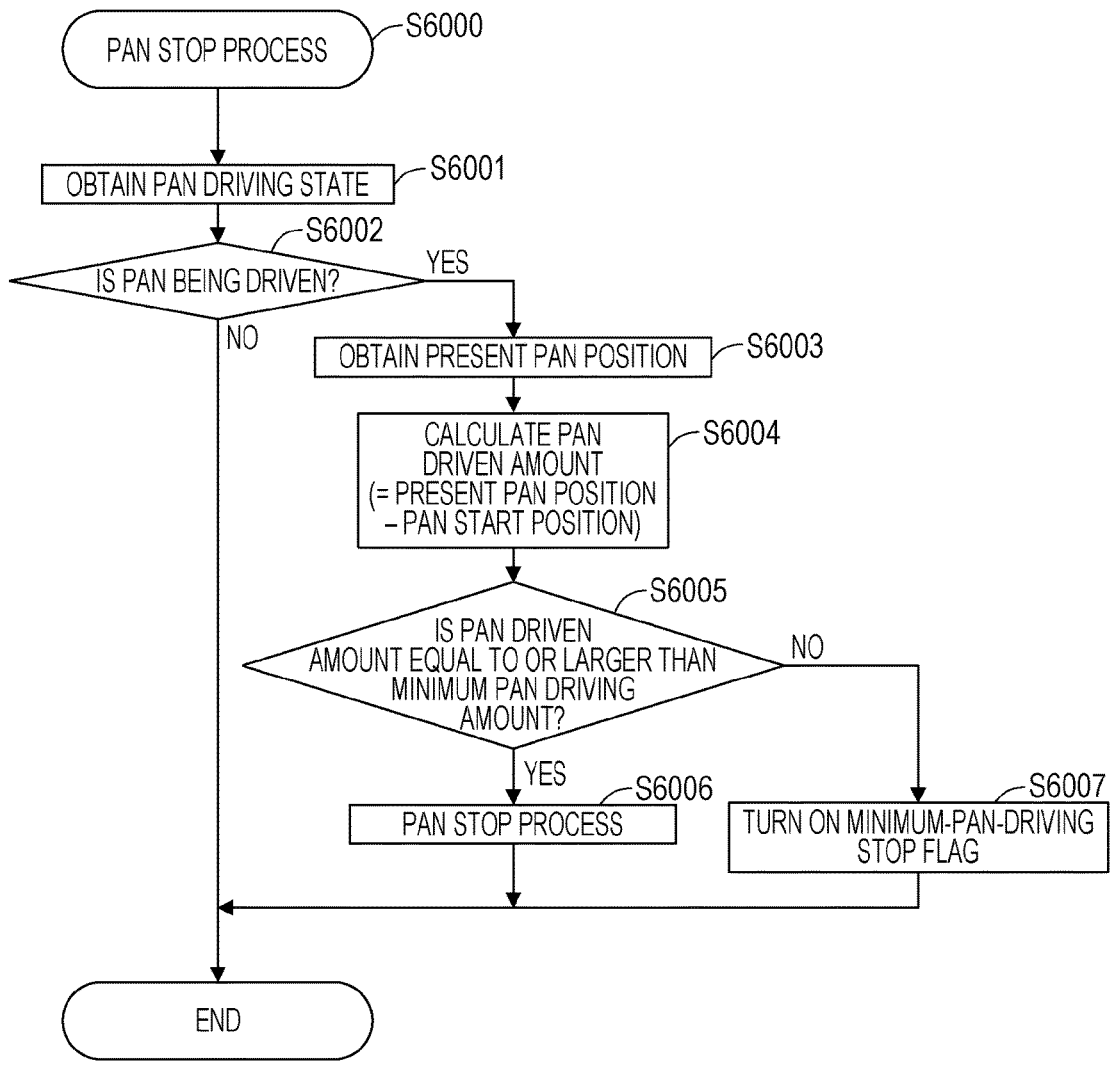
FIG. 7 is a flowchart for explaining a pan stop process according to the first embodiment of the present invention.

FIG. 7 is a flowchart for explaining the pan stop process performed by the network camera 1000 according to this embodiment. The process is executed by the system control unit 1003.

In step S6001 in FIG. 7, the system control unit 1003 obtains a pan driving state from the pan-tilt control unit 1008.

In step S6002, the system control unit 1003 determines whether the pan driving state obtained in step S6001 indicates "under suspension" or "in operation".

If the system control unit 1003 determines that the pan driving state obtained in step S6001 indicates "under suspension", the system control unit 1003 terminates the process in FIG. 7. In contrast, if the system control unit 1003 determines that the pan driving state obtained in step S6001 indicates "in operation", the system control unit 1003 goes to step S6003.

In step S6003, the system control unit 1003 obtains the present position of the image capturing unit 1001 in the pan direction from the pan-tilt control unit 1008.

In step S6004, the system control unit 1003 calculates the pan driven amount of the image capturing unit 1001 by subtracting the pan-driving start position stored in step S4001 from the position obtained in step S6003.

In step S6005, the system control unit 1003 determines whether the pan driven amount calculated in step S6004 is a minimum pan driving amount (a predetermined pan driving amount) or more.

If the system control unit 1003 determines that the pan driven amount calculated in step S6004 is the minimum pan driving amount or more, the system control unit 1003 goes to step S6006. In contrast, if the system control unit 1003 determines that the pan driven amount calculated in step S6004 is not the minimum pan driving amount or more, the system control unit 1003 goes to step S6007.

Here, the minimum pan driving amount is a parameter for setting the minimum value of the pan driving amount of the image capturing unit 1001. For example, assume that the network camera 1000 receives a stop command in which a pan stop designation is specified as a parameter directly after receiving a direction-designating moving command in which a leftward or rightward direction designation is specified as a parameter.

Also under such assumption, this parameter allows the image capturing unit 1001 to be stopped after certainly driving the image capturing unit 1001 in the pan direction by a predetermined driving amount. This parameter is set in view the user friendliness of the network camera 1000 and the characteristics of the pan/tilt driving mechanism including the pan driving unit 1006 and so on.

The minimum pan driving amount is stored in the storage unit provided in the system control unit 1003. The minimum tilt driving amount is also stored in the storage unit provided in the system control unit 1003.

The system control unit 1003 of this embodiment corresponds to an amount-of-change determination unit that determines whether the amount of change of the image capturing unit 1001 in the pan direction from the time at which a direction-designating moving command is received by the communication unit 1009 to the time at which a stop command is received by the communication unit 1009 is a predetermined amount or more.

In step S6006, the system control unit 1003 instructs the pan-tilt control unit 1008 to stop the rotation of the image capturing unit 1001 in the pan direction. The pan-tilt control unit 1008 stops the pan driving unit 1006 in operation in accordance with the instruction.

In step S6007, the system control unit 1003 turns on the value of the minimum-pan-driving stop flag stored in the storage unit provided in the system control unit 1003.

This process allows the rotation stop process to be executed if the driving amount of the image capturing unit 1001 in the pan direction is equal or larger than a minimum driving amount at the point of time an instruction to stop the rotation of the image capturing unit 1001 in the pan direction is received. In contrast, if the driving amount of the image capturing unit 1001 in the pan direction is less than the minimum driving amount, the system control unit 1003 can suspend the rotation stop process and shift to a monitoring state for monitoring the driving amount of the image capturing unit 1001 in the pan direction.

Since the tilt stop process in step S7000, described above, is a process in which "pan" in the pan stop process is replaced with "tilt", and is similar to the pan stop process, a description thereof will be omitted.

Figure 8:
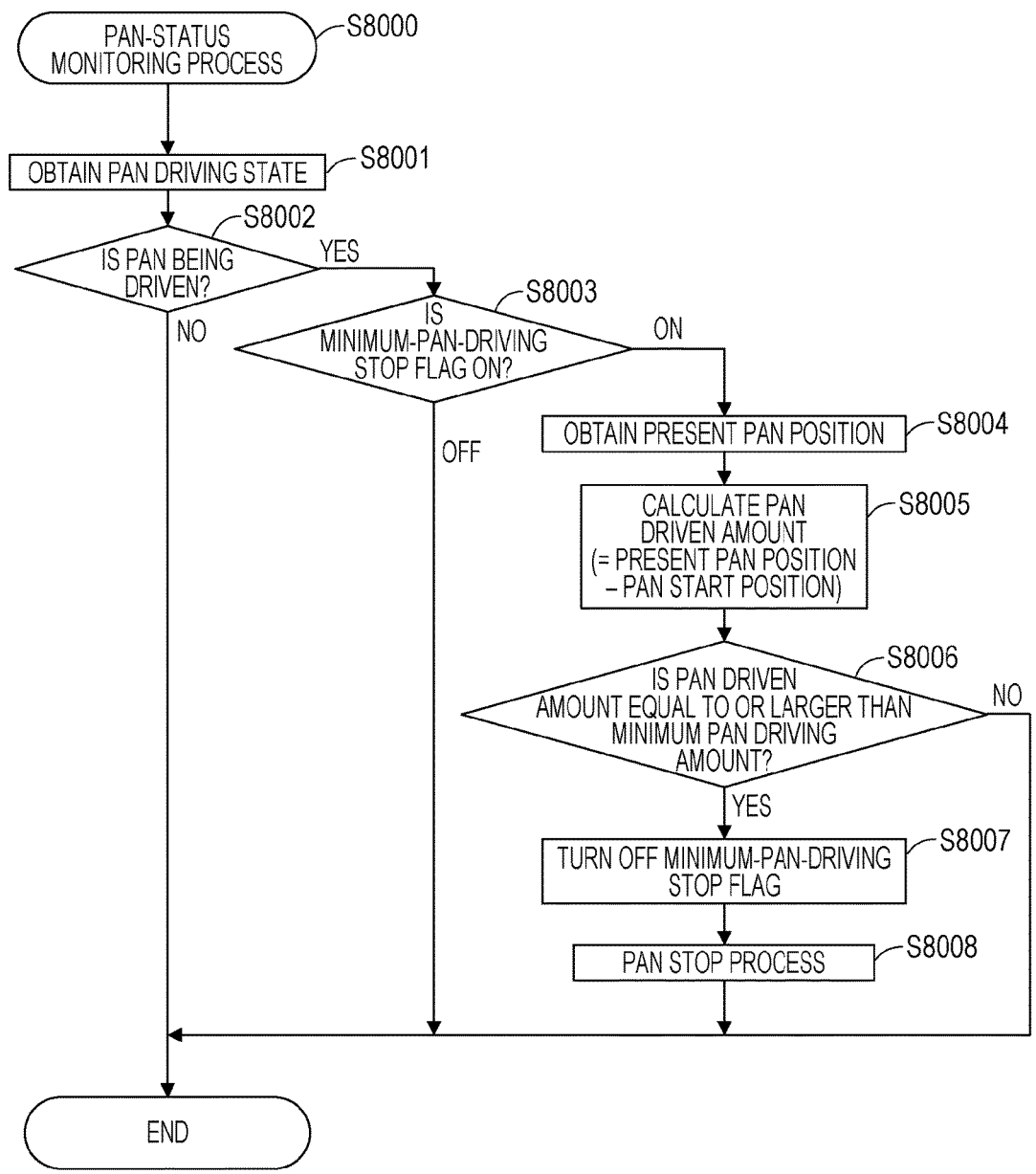
FIG. 8 is a flowchart for explaining a pan-status monitoring process according to the first embodiment of the present invention.

Subsequently, FIG. 8 is a flowchart for explaining the pan-status monitoring process in the network camera 1000 according to this embodiment. This process is executed by the system control unit 1003. This process is executed every time a pan-status monitoring event is issued from a pan-status monitoring timer provided in the system control unit 1003 at predetermined intervals.

Since step S8001 in FIG. 8 is the same as step S6001, a description thereof will be omitted.

Since step S8002 is the same as step S6002, a description thereof will be omitted.

In step S8003, the system control unit 1003 determines whether the value of the minimum-pan-driving stop flag stored in the storage unit provided in the system control unit 1003 is ON or OFF.

If the system control unit 1003 determines that the value of the minimum-pan-driving stop flag stored in the storage unit provided in the system control unit 1003 is ON, the system control unit 1003 goes to step S8004. In contrast, if the system control unit 1003 determines that the value of the minimum-pan-driving stop flag stored in the storage unit provided in the system control unit 1003 is OFF, the system control unit 1003 terminates the process in FIG. 8.

Since steps S8004 to S8006 are the same as step S6003 to S6005, descriptions thereof will be omitted.

In step S8007, the system control unit 1003 sets the value of the minimum-pan-driving stop flag stored in the storage unit provided in the system control unit 1003 to OFF.

Since step S8008 is the same as step S6006, a description thereof will be omitted.

This process allows the system control unit 1003 to execute the stop process, which is suspended when the driving amount of the image capturing unit 1001 in the pan direction is less than the minimum driving amount at the point of time an instruction to stop the rotation of the image capturing unit 1001 in the pan direction is received, at the point in time the driving amount in the pan direction becomes the minimum driving amount or more.

Since the tilt-status monitoring process in step S9000, described above, is a process in which "pan" in the pan-status monitoring process is replaced with "tilt", and is similar to the pan-status monitoring process, a description thereof will be omitted.

As described above, the network camera 1000 of this embodiment starts to change the image capture direction of the image capturing unit 1001 when a direction-designating moving command is received by the communication unit 1009. When a stop command is received by the communication unit 1009, and the amount of change in the image capture direction of the image capturing unit 1001 is not a predetermined amount or more, the network camera 1000 continues to change the image capture direction of the image capturing unit 1001 until the amount of change reaches the predetermined amount. (This control is hereinafter sometimes referred to as minimum-driving-amount ensuring control.)

This allows the image capture direction of the image capturing unit 1001 to be changed by a predetermined amount even if the period after receiving a direction-designating moving command for starting to change the image capture direction of the image capturing unit 1001 until receiving a stop command for stopping the change is extremely short.

This can prevent the user of the client device 2000 from determining by mistake that the image capture direction of the image capturing unit 1001 has not been changed even though a direction-designating moving command is transmitted.

In the process of minimum-driving-amount ensuring control in this embodiment shown in FIGS. 4 to 8 and so on, the image capturing unit 1001 is rotated in the pan direction or the tilt direction; however, the invention is not limited thereto.

For example, in place of (or in addition to) the process of rotating the image capturing unit 1001 in the pan direction and the tilt direction, the process of minimum-driving-amount ensuring control shown in FIGS. 4 to 8 and so on may be applied to the process of changing the zoom magnification of the image capturing unit 1001.

Similarly, in place of (or in addition to) the process of rotating the image capturing unit 1001 in the pan direction and the tilt direction, the process of minimum-driving-amount ensuring control shown in FIGS. 4 to 8 and so on may be applied to the process of rotating the image capturing unit 1001 about the optical axis of the lens of the image capturing unit 1001.

Although, in this embodiment, the process of minimum-driving-amount ensuring control is executed at the network camera 1000, the invention is not limited thereto. For example, the process of minimum-driving-amount ensuring control may be executed at the camera control application of the client device 2000.

Although, in this embodiment, the system control unit 1003 is configured to use a position of the image capturing unit 1001 in the pan direction and the tilt direction, the present invention is not limited thereto. For example, in the process of minimum-driving-amount ensuring control, time may be used. This time may be the time at which the image capturing apparatus 1000 has received a command, the time at which the client device 2000 has transmitted a command, or the time at which the client device 2000 has received a transmission instruction.

For example, in step S4001, the system control unit 1003 may store the present system time in the storage unit provided in the system control unit 1003.

In step S6003, the system control unit 1003 may obtain the present system time.

Added to which, in step S6004, the system control unit 1003 calculates an elapsed time after the rotation of the image capturing unit 1001 in the pan direction is started by subtracting the system time stored in step S4001 from the system time obtained in step S6003.

Subsequently, in step S6005, the system control unit 1003 determines whether the elapsed time calculated in step S6004 is equal to or longer than a minimum pan elapsed time. The system control unit 1003 of this embodiment corresponds to an elapsed-time determination unit that determines whether the time elapsed after a direction-designating moving command is received by the communication unit 1009 until a stop command is received by the communication unit 1009 is a predetermined time or longer.

If the system control unit 1003 determines that the elapsed time calculated in step S6004 is the minimum pan elapsed time or longer, then the system control unit 1003 goes to step S6006. In contrast, if the system control unit 1003 determines that the elapsed time calculated in step S6004 is not the minimum pan elapsed time or longer, the system control unit 1003 goes to step S6007.

This also applies to tilt driving.

Although, in this embodiment, the setting value of the pan (tilt) minimum driving amount is unique irrespective of the zoom magnification of the image capturing unit 1001, the present invention is not limited thereto. For example, a zoom mechanism capable of changing the zoom magnification of the image capturing unit 1001 may be provided in the network camera 1000, and the minimum driving amount may be changed depending on the zoom magnification.

For example, even with the same absolute amount of pan-tilt movement, the relative amount of movement on the screen of the display unit 2001 of the client device 2000 changes with a change in zoom magnification. The relative amount of movement on the screen of the display unit 2001 increases as the zoom magnification of the image capturing unit 1001 increases and the angle of view decreases.

In consideration of this relationship, the pan (tilt) minimum driving amount may be decreased as the zoom magnification increases, and may be increased as the zoom magnification decreases. This ensures the same relative pan (tilt) minimum driving amount on the screen of the display unit 2001 irrespective of a change in the zoom magnification (a change in the angle of view) of the image capturing unit 1001, thereby further enhancing the user-friendliness.

Although this embodiment uses the command format shown in FIGS. 3A to 3D as a command group for operating the network camera 1000, the present invention is not limited thereto. More specifically, for example, commands based on Open Network Video Interface Forum (hereinafter referred to as ONVIF) may be used.

Figure 9:
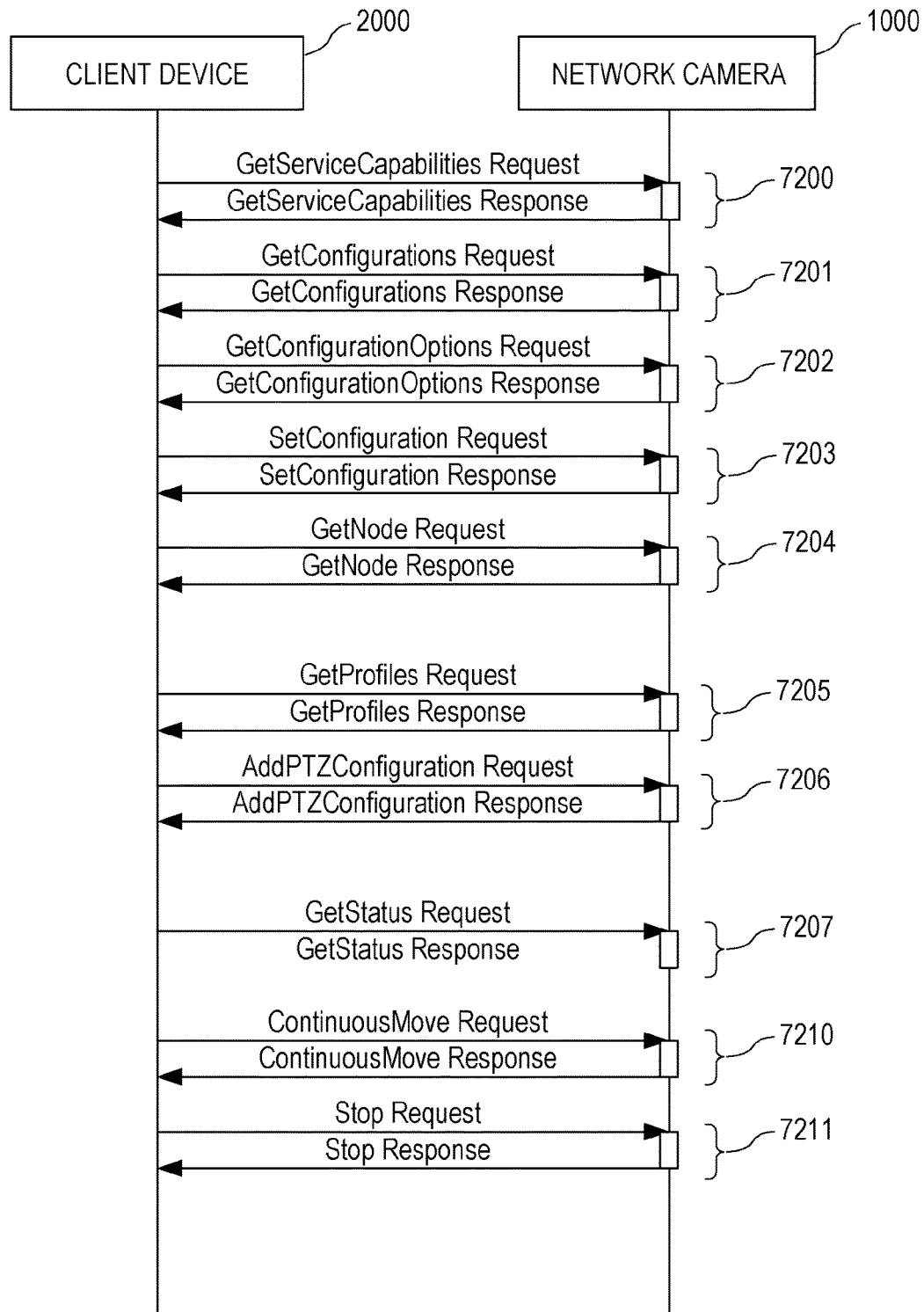
FIG. 9 is a sequence chart illustrating an example of a command sequence of the network camera and the client device according to the first embodiment of the present invention.

Referring now to FIG. 9, command transactions using this ONVIF standard will be described. FIG. 9 is a sequence chart illustrating an example of typical command transactions for a panning and tilting motion between the network camera 1000 and the client device 2000.

The transaction in this embodiment refers to a pair of a command transmitted from the client device 2000 to the network camera 1000 and a response that the network camera 1000 returns to the client device 2000 in response to that.

Reference sign 7200 in FIG. 9 denotes a transaction for GetServiceCapabilities. By executing this transaction, the client device 2000 can obtain the capability of a pan-tilt zoom (hereinafter referred to as PTZ) service of the network camera 1000.

Reference sign 7201 denotes a transaction for GetConfiguration. By executing this transaction, the client device 2000 can obtain all PTZConfiguration of the network camera 1000. PTZConfiguration includes information indicating the coordinate system of pan-tilt.

Reference sign 7202 denotes a transaction for GetConfigurationOption. By executing this transaction, the client device 2000 can obtain options of changeable settings of desired PTZConfiguration and so on. Examples of the options and so on include information on coordinates supported in PTZ designation and the range of time-out values of PTZ commands.

Reference sign 7203 denotes a transaction for SetConfiguration. By executing this transaction, the client device 2000 can change the setting of desired PTZConfiguration.

Reference sign 7204 denotes a transaction for GetNode. By executing this transaction, the client device 2000 can obtain the details of parameters of PTZ, such as a method for designating an action on the PTZ of the network camera 1000.

Reference sign 7205 denotes a transaction for GetProfiles. By executing this transaction, the client device 2000 can obtain a list of MediaProfile that the network camera 1000 has. Note that MediaProfile is information on the format of image data that the network camera 1000 can transmit (for example, a compression coding format).

Reference sign 7206 denotes a transaction for AddPTZConfiguration. By executing this transaction, the client device 2000 can link desired PTZConfiguration to MediaProfile in the following case: a case where MediaProfile to which PTZConfiguration that the network camera 1000 wants to use is linked is not present.

Reference sign 7207 denotes a transaction for GetStatus. By executing this transaction, the client device 2000 can obtain PTZ status information, such as the present position and the driving state of the network camera 1000.

When the system control unit 2003 of this embodiment determines that the rightward moving button 4004 or the like is pressed by the user, the system control unit 2003 may transmit a direction-designating moving command and a GetStatus command to the network camera 1000.

Thus, the system control unit 2003 serves as a start-position acquisition unit that obtains the position of the image capturing unit 1001 in the pan direction and the tilt direction at the start of the movement of the image capturing unit 1001.

Furthermore, when the system control unit 2003 of this embodiment determines that the user has stopped pressing the rightward moving button 4004 or the like, the system control unit 2003 may transmit a stop command and the GetStatus command to the network camera 1000.

Thus, the system control unit 2003 serves as a stop-position acquisition unit that obtains the position of the image capturing unit 1001 in the pan direction and the tilt direction when a stop command is transmitted from the communication unit 2004.

Furthermore, the system control unit 2003 of this embodiment corresponds to a determination unit that determines, when the user stops pressing the rightward moving button 4004 or the like, whether the difference between a position obtained as a start-position acquisition unit and a position obtained as a stop-position acquisition unit is a predetermined value or greater. Furthermore, if the system control unit 2003 of this embodiment determines that the difference value is the predetermined value or greater, the system control unit 2003 may instruct the communication unit 2004 to transmit a stop command to the network camera 1000.

If the system control unit 2003 of this embodiment determines that the difference value is not a predetermined or greater, the system control unit 2003 may obtain the position of the image capturing unit 1001 again as a stop-position acquisition unit. In addition, the system control unit 2003 of this embodiment may determine as a determination unit whether the difference between the position obtained as the start-position acquisition unit and the position obtained as the stop-position acquisition unit is a predetermined value or greater.

Reference sign 7210 denotes a transaction for ContinuousMove. By executing this transaction, the client device 2000 can instruct the network camera 1000 to start PTZ driving according to a moving direction designation. PTZ, which is driven according to this transaction, continues the driving until a stop command, described later, is transmitted.

Reference sign 7211 denotes a transaction for Stop. By executing this transaction, the client device 2000 can instruct the network camera 1000 to stop the PTZ action.

FIGS. 10A to 10C are diagrams showing the GetNode command described in FIG. 9, a response to the command, and the structure of data related to the command and the response. This data structure is defined using, for example, an XML Schema Definition language (hereinafter, sometimes referred to as XSD).

FIG. 10A is a diagram of a definition example of the GetNode command. The GetNode command includes NodeToken as an internal field. The client device 2000 can designate a desired PTZNode using the NodeToken. In other words, NodeToken corresponds to an identifier for identifying PTZNode.

PTZNode is information indicating, for example, the movable ranges and so on of the pan driving unit 1006, the tilt driving unit 1007, and the zoom mechanism of the image capturing unit 1001.

FIG. 10B is a diagram of a definition example of GetNodeResponse. GetNodeResponse can include only one PTZNode-type data field.

FIG. 10C is a diagram showing a definition example of PTZNode-type data type. The PTZNode-type data type is used in GetNodeResponse. The PTZNode-type data is defined as a complex type XML by declaring complexType.

The PTZNode type includes, as elements, information on the supported PTZ coordinate system and so on, as described above. The last Extension field in the PTZNode type is a field provided to extend the data type.

The use of commands based on the ONVIF standard allows instructions to start and stop driving of the pan driving unit 1006 and the tilt driving unit 1007 of the network camera 1000 and the present position and driving state of the driving units 1006 and 1007 to be obtained.

Second Embodiment

Subsequently, referring to FIGS. 11A and 11B and FIG. 12, a second embodiment of the present invention will be described. The same components as those in the first embodiment are given the same reference numerals, and descriptions thereof may be omitted.

In the network camera 1000 of the first embodiment, the pan driving unit 1006 (the tilt driving unit 1007) has a minimum pan driving amount (a minimum tilt driving amount). Furthermore, even if a pan (tilt) stop command is received directly after a direction-designating moving command is received by the communication unit 1009, the pan driving unit 1006 (the tilt driving unit 1007) stops after certainly driving by a minimum pan driving amount (a minimum tilt driving amount).

In contrast, the network camera 1000 of the second embodiment differs in that the minimum pan driving amount (the minimum tilt driving amount) can be set by the client device 2000 (that is, a user who operates the client device 2000). This allows user's intention to be reflected in more detail to the usability of the network camera 1000 in the image capture direction. The second embodiment that takes the above points into consideration will be described below.

FIGS. 11A and 11B are diagrams for explaining commands that the client device 2000 provides to the network camera 1000. As in FIGS. 3A to 3C, the command requests each include information on the destination address indicating the address of the network camera 1000 that is the target of the commands and information on the source address of the client device 2000 that is the source of the commands. The commands each include information on the details of the command and a parameter.

FIG. 11A shows a minimum-driving-amount setting command for setting a minimum pan driving amount to the pan driving unit 1006 of the network camera 1000 and setting a minimum tilt driving amount to the tilt driving unit 1007. Minimum-driving-amount setting command ID in the minimum-driving-amount setting command is an ID for identifying the minimum-driving-amount setting command.

Minimum pan driving amount in the minimum-driving-amount setting command indicates the minimum pan driving amount of the pan driving unit 1006. Minimum tilt driving amount in the minimum-driving-amount setting command indicates the minimum tilt driving amount of the tilt driving unit 1007.

With these commands, the client device 2000 can change the minimum pan driving amount and the minimum tilt driving amount stored in the storage unit provided in the system control unit 1003 of the network camera 1000 to any values.

A command shown in FIG. 11B will be described later.

Figures 12, 13A:
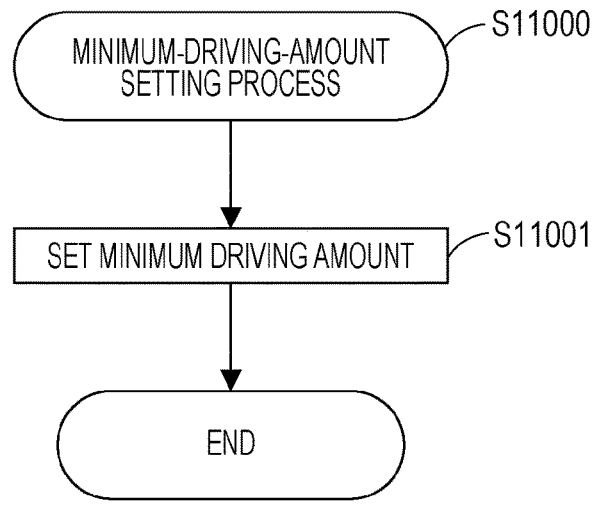
FIG. 12 is a flowchart for explaining a minimum-driving-amount setting process according to the second embodiment of the present invention.
FIG. 13A is a diagram for explaining a command that the client device provides to the network camera according to a third embodiment of the present invention.

Subsequently, FIG. 12 is a flowchart for explaining a minimum-driving-amount setting process at the network camera 1000 according to the second embodiment. This process is executed by the system control unit 1003.

In this embodiment, if the system control unit 1003 determines in step S3000 that the command is not a stop command in which a tilt stop designation is a parameter, the system control unit 1003 determines whether the command that the communication unit 1009 has received is a minimum-driving-amount setting command.

If the system control unit 1003 determines that the command that the communication unit 1009 has received is a minimum-driving-amount setting command, the system control unit 1003 goes to step S11000 in FIG. 12.

In step S11001, the system control unit 1003 updates the minimum pan driving amount and the minimum tilt driving amount stored in the storage unit of the system control unit 1003 to a minimum pan driving amount and a minimum tilt driving amount, which are parameters of the minimum-driving-amount setting command that the communication unit 1009 has received.

Thus, the minimum pan driving amount updated in step S11001 is used in the process of step S6005 and the process of step S8006. This also applies to the minimum tilt driving amount.

As described above, in this embodiment, the minimum pan driving amount and the minimum tilt driving amount used in minimum-driving-amount ensuring control can be set at the client device 2000. This allows the user of the client device 2000 to set the minimum pan driving amount and the minimum tilt driving amount, thereby achieving pan operation performance reflecting user's intension in more detail.

Although this embodiment is configured such that independent commands are provided only to set the minimum pan driving amount and the minimum tilt driving amount, the present invention is not limited thereto. For example, the minimum pan driving amount and the minimum tilt driving amount may be added to an existing direction-designating moving command.

This will be specifically described using FIG. 11B and so on. FIG. 11B shows a direction designation command with minimum-driving-amount settings for starting movement of the network camera 1000 in the image capture direction and for setting a minimum pan driving amount and a minimum tilt driving amount. In other words, the command shown in FIG. 11B is a command in which a minimum pan driving amount and a minimum tilt driving amount are added to the direction-designating moving command shown in FIG. 3A.

Direction designation command ID in the direction designation command is an identifier for identifying the direction designation command with minimum driving amount settings. Direction designation (information) in the direction designation command with minimum driving amount settings indicates one of "upward", "downward", "leftward", and "rightward".

Minimum pan driving amount in the direction designation command with minimum driving amount settings indicates the minimum pan driving amount of the pan driving unit 1006. Minimum tilt driving amount in the direction designation command with minimum driving amount settings indicates the minimum tilt driving amount of the tilt driving unit 1007.

With this command, the client device 2000 can start to change the image capture direction of the image capturing unit 1001 and can change the minimum pan driving amount and the minimum tilt driving amount stored in the storage unit of the system control unit 1003.

In step S3000, the system control unit 1003 determines whether the command that the communication unit 1009 has received is the direction designation command with minimum driving amount settings.

If the system control unit 1003 determines that the command is a direction designation command with minimum driving amount settings, the system control unit 1003 updates the minimum pan driving amount and the minimum tilt driving amount that the storage unit of the system control unit 1003 stores to the minimum pan driving amount and the minimum tilt driving amount of the parameters of the command.

After the update, if the system control unit 1003 determines that the command that the communication unit 1009 has received is the direction designation command with minimum driving amount settings in which a leftward or rightward direction designation is a parameter, the system control unit 1003 goes to step S4000. If the system control unit 1003 determines that the command that the communication unit 1009 has received is a direction designation command with minimum driving amount settings in which an upward or downward direction designation for is a parameter, the system control unit 1003 goes to step S5000.

If the system control unit 1003 determines that the command that the communication unit 1009 has received is not a direction designation command with minimum driving amount settings, then the system control unit 1003 determines whether the command that the communication unit 1009 has received is, for example, a direction-designating moving command.

Although the second embodiment is configured not to limit the programmable range of the minimum pan driving amount (the minimum tilt driving amount) of the pan driving unit 1006 (the tilt driving unit 1007), the present invention is not limited thereto. For example, this range may be limited.

For example, when the communication unit 1009 has received the minimum-driving-amount setting command (the direction designation command with minimum driving amount settings), the system control unit 1003 may determine whether the minimum pan driving amount (the minimum tilt driving amount), which is a parameter of the command, is within a predetermined range.

If the system control unit 1003 determines that the minimum driving amount is not within the predetermined range, and the upper limit of the minimum pan driving amount (the minimum tilt driving amount) is beyond the predetermined range, the system control unit 1003 may set the upper limit as the upper limit of the predetermined range. If the system control unit 1003 determines that the minimum driving amount is not within the predetermined range, and the minimum pan driving amount (the minimum tilt driving amount) is below the predetermined range, the system control unit 1003 may set (round off) the lower limit as the lower limit of the predetermined range.

Furthermore, if the system control unit 1003 determines that the minimum driving amount is not within the predetermined range, the system control unit 1003 may instructs the communication unit 1009 to transmit an error response indicating that the value of the minimum pan driving amount (the minimum tilt driving amount) exceeds the predetermined range.

Third Embodiment

Subsequently, a third embodiment of the present invention will be described with reference to FIGS. 13A to 13C and FIG. 14. The same components as those in the above embodiments are given the same reference signs, and descriptions thereof may be omitted.

In the second embodiment, a method for designating a minimum pan driving amount (a minimum tilt driving amount) of the pan driving unit 1006 (the tilt driving unit 1007) of the network camera 1000 with the client device 2000 (that is, the user).

In contrast, the network camera 1000 of the third embodiment transmits information indicating whether the minimum pan driving amount (the minimum tilt driving amount) of the pan driving unit 1006 (the tilt driving unit 1007) can be set from the client device 2000 to the client device 2000. This makes it easier to reflect user's intention to the operability of the network camera 1000 in the image capture direction. The third embodiment with consideration given to the above points will be described hereinbelow.

Subsequently. FIG. 13A is a diagram for explaining a command that the client device 2000 provides to the network camera 1000, and FIGS. 13B and 13C are diagrams for explaining responses that the network camera 1000 provides to the client device 2000.

As shown in FIG. 13A, the command request includes information on a destination address indicating the address of the network camera 1000, which is the target of the command, and information on the source address of the client device 2000, which is the source of the command.

As shown in FIGS. 13B and 13C, the command responses each include information on a destination address indicating the address of the client device 2000, which is a target to which the result of the command is returned, and information on the source address of the network camera 1000, which is the source of the result. The commands each further include information on the details of the command and a parameter.

FIG. 13A is a minimum-driving-amount-information acquisition command for obtaining information indicating whether the network camera 1000 can execute the minimum-driving-amount ensuring control. In other words, this information indicates whether the pan driving unit (the tilt driving unit) stops after driving by a pan (tilt) minimum driving amount even if a pan (tilt) stop command is received directly after a pan (tilt) direction-designating moving command is received.

Minimum-driving-amount-information acquisition command ID in the minimum-driving-amount-information acquisition command is an ID for identifying the minimum-driving-amount-information acquisition command.

FIG. 13B is a response to the minimum-driving-amount-information acquisition command, which notifies the client device 2000 of information indicating whether the network camera 1000 can execute the minimum-driving-amount ensuring control. Minimum-driving-amount-ensuring-information acquisition response ID in this response is an ID for identifying this response. Minimum-driving-amount ensuring function (information) is a parameter of the response.

Minimum-driving-amount ensuring function whose value is "available" indicates that the network camera 1000 can execute the minimum-driving-amount ensuring control function. In contrast, minimum-driving-amount ensuring function whose value is "unavailable" indicates that the network camera 1000 cannot execute the minimum-driving-amount ensuring control function.

Figures 14, 15A:
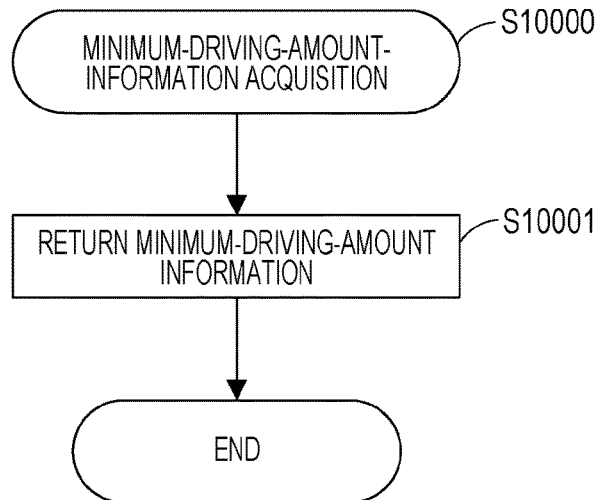
FIG. 14 is a flowchart for explaining a minimum-driving-amount-information acquisition process according to the third embodiment of the present invention.
FIG. 15A is a diagram showing a definition example of a command according to the third embodiment of the present invention.

FIG. 14 is a flowchart for explaining a minimum-driving-amount-information acquisition process of the network camera 1000 according to the third embodiment. Note that this process is executed by the system control unit 1003.

In this embodiment, if the system control unit 1003 determines in step S3000 that the command is not a stop command in which a tilt stop designation is a parameter, the system control unit 1003 determines whether the command that the communication unit 1009 has received is a minimum-driving-amount-information acquisition command. If the system control unit 1003 determines that the command that the communication unit 1009 has received is a minimum-driving-amount-information acquisition command, the system control unit 1003 goes to step S10000 in FIG. 14.

In step S10001 of FIG. 14, the system control unit 1003 stores information indicating whether the minimum pan driving amount and the minimum tilt driving amount can be set in the response in the format shown in FIG. 13B. The system control unit 1003 instructs the communication unit 1009 to transmit the stored response as a response to the minimum-driving-amount-information acquisition command to the client device 2000.

As described above, in this embodiment, the client device 2000 can obtain information indicating whether the minimum pan driving amount and the minimum tilt driving amount can be set in the network camera 1000 from the network camera 1000. This makes it easy to determine whether user's intension can be reflected to pan operation, thus enhancing the user-friendliness.

Although, in this embodiment, the response to the minimum-driving-amount-information acquisition command includes information whether a minimum pan driving amount and a minimum tilt driving amount can be set, the present invention is not limited thereto. For example, this response may include information on a programmable minimum pan driving amount (minimum tilt driving amount), that is, the upper limit and the lower limit of the range, instead of this information.

Since this allows the user to know not only whether a minimum pan driving amount and a minimum tilt driving amount can be set but also programmable ranges, pan operability that reflects user's intention more can be achieved.

Although, in this embodiment, the minimum-driving-amount-information acquisition command is described using the command format in FIGS. 13A to 13C, the present invention is not limited thereto. For example, the minimum-driving-amount-information acquisition command may be described more specifically using a data structure defined in XSD used in the ONVIF standard. FIGS. 15A to 15D are diagrams showing definition examples of the data structure.

FIG. 15A is a diagram showing a definition example of PTZNodeExtension-type data type of Extension field in the PTZNode-type data in FIG. 10C, described in the first embodiment. As shown in FIG. 15A, the PTZNodeExtension-type data is defined as a complex type of XML by declaration of complexType.

In the PTZNodeExtension type, the first field is a SupportedPresetTour field. In the SupportedPresetTour field, setting for preset tour for moving the image capturing unit 1001 in sequence to several PTZ positions registered in advance to cause it to perform monitoring operation is performed.

The PTZNodeExtension type is provided with a PTZNodeExtension2-type Extension field to extend the data type.

FIG. 15B is a diagram showing a definition example of the PTZNodeExtension2-type data type, which is an Extension field, in the PTZExtension-type data in FIG. 15A. As shown in FIG. 15B, the PTZNodeExtension2-type data is defined as a complex type XML by declaration of complexType.

In the PTZNodeExtension2 type, the first field is a SupportedMinimumMoveControl field, in which information on minimum-driving-amount ensuring control is described.

The SupportedMinimumMoveControl field is described in MinimumMoveControlSupported type. The Extension field in the PTZNodeExtension2 type is provided to extend the data type.

FIG. 15C is a diagram showing a definition example of MinimumMoveControlSupported-type data type. The MinimumMoveControlSupported type is defined as a complex type XML by declaration of complexType.

In the MinimumMoveControlSupported type, the first field is a PanMinimumMove field, which indicates, in this embodiment, programmable upper and lower limits of the minimum pan driving amount of the network camera 1000. The second field, TiltMinimumMove field, indicates programmable upper and lower limits of the minimum tilt driving amount of the network camera 1000.

Both the PanMinimumMove field and the TiltMinimumMove field are described in FloatRange type.

In the MinimumMoveControlSupported type, the last field is an Extension field, which is provided to extend future data extension. The minOccurs="0" specifier indicates that the Extension field is an optional field.

FIG. 15D is a diagram showing a definition example of FloatRange-type data type. In the FloatRange type, the first field is a Min field, and the second field is a Max field, both of which are described in Float type.

PanMinimumMove and TiltMinimumMove in MinimumMoveControlSupported type in FIG. 15C can each describe the lower limit of the minimum driving amount in the Min field and can each described the upper limit of the minimum driving amount in the Max field. For the description, FloatRange type is used.

Thus, the network camera 1000 of the third embodiment can present to the client device 2000 programmable upper and lower limits for the minimum driving amount in the minimum-driving-amount ensuring control using the data structure shown in FIGS. 15A to 15D. For example, by setting a value equal to or greater than 1 in the Min field and the Max field, the network camera 1000 can present to the client device 2000 that the network camera 1000 supports the minimum-driving-amount ensuring control.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234960, filed Nov. 13, 2013, which is hereby incorporated by reference herein in its entirety.

The invention claimed is:

1. An image capturing apparatus that communicates with an external device, the image capturing apparatus comprising:
  at least one processor;
  a field-of-view mechanical mechanism configured to change a field of view for capturing an image of a subject;
  a receiving unit configured to receive, from the external device, a command for controlling the field-of-view mechanical mechanism;
  a control unit configured to control, when the receiving unit receives a command to start to change a field of view using the field-of-view mechanical mechanism, the field-of-view mechanical mechanism to start to change the field of view; and
  an amount-of-change determination unit configured to determine an amount of change in the field of view using the field-of-view mechanical mechanism,
  wherein the control unit controls the field-of-view mechanical mechanism such that the amount of change in the field of view determined by the amount-of-change determination unit becomes a predetermined amount or more, irrespective of whether the receiving unit receives a command to stop changing the field of view using the field-of-view mechanical mechanism, and
  wherein the receiving unit, the control unit, and the amount-of-change determination unit are each implemented by at least one of the at least one processor.

2. The image capturing apparatus according to claim 1, wherein upon receiving a command to stop changing the field of view using the field-of-view mechanical mechanism before the amount of change in the field of view determined by the amount-of-change determination unit becomes the predetermined amount or more, the control unit performs control to continue using the field-of-view mechanical mechanism until the amount of change in the field of view becomes the predetermined amount or more.

3. The image capturing apparatus according to claim 1, wherein, if the amount of change in the field of view determined by the amount-of-change determination unit is the predetermined amount or more, the control unit stops changing the field of view using the field-of-view mechanical mechanism.

4. The image capturing apparatus according to claim 1, wherein the control unit controls the field-of-view mechanical mechanism using a time designated by the command to start to change the field of view using the field-of-view mechanical mechanism and the command to stop changing the field of view using the field-of-view mechanical mechanism.

5. The image capturing apparatus according to claim 1, further comprising a storage configured to store the predetermined amount,
  wherein the receiving unit receives a designation command for designating an amount of change in the field of view to be performed by the field-of-view mechanical mechanism, and
  when the designation command is received by the receiving unit, the control unit updates the predetermined amount that the storage stores to the amount designated by the designation command.

6. The image capturing apparatus according to claim 1, wherein the amount-of-change determination unit determines the amount of change in the field of view based on the amount of change in the field of view from a position at which the change in the field of view is started to a position at which the change in the field of view is stopped.

7. The image capturing apparatus according to claim 1, wherein the amount-of-change determination unit determines the amount of change in the field of view based on an elapsed time from a time indicated by the command to start to change the field of view using the field-of-view mechanical mechanism to a time designated by the command to stop changing the field of view using the field-of-view mechanical mechanism.

8. The image capturing apparatus according to claim 1, wherein the field-of-view mechanical mechanism includes at least one of a pan unit that rotates the field of view for capturing an image of the subject in a pan direction, a tilt unit that rotates the field of view in a tilt direction, and a zoom unit that changes a range of the field of view for capturing an image of the subject.

9. The image capturing apparatus according to claim 1, wherein the command to start to change the field of view using the field-of-view mechanical mechanism includes a command to designate an operation of continuing changing the field of view in a fixed direction.

10. The image capturing apparatus according to claim 1, wherein the field-of-view mechanical mechanism includes at least one of a stepper motor and a pan-tilt controller.

11. An image capturing system comprising:
  an external device that communicates with an image capturing apparatus; and
  the image capturing apparatus, wherein the image capturing apparatus includes:
  a first at least one processor,
  a field-of-view mechanical mechanism configured to change a field of view for capturing an image of a subject, a receiving unit configured to receive, from the external device, a command for controlling the field-of-view mechanical mechanism, a control unit configured to control, when the receiving unit receives a command to start to change a field of view using the field-of-view mechanical mechanism, the field-of-view mechanical mechanism to start to change the field of view, and an amount-of-change determination unit configured to determine an amount of change in the field of view using the field-of-view mechanical mechanism, wherein the receiving unit, the control unit, the amount-of-change determination unit each are implemented by at least one of the first at least one processor, and wherein the external device includes:

a second at least one processor, a transmitting unit implemented by at least one of the second at least one processor and configured to transmit, to the image capturing apparatus, a command for controlling the field-of-view mechanical mechanism, wherein the control unit controls the field-of-view mechanical mechanism such that the amount of change in the field of view determined by the amount-of-change determination unit becomes a predetermined amount or more, irrespective of whether the receiving unit receives a command to stop changing the field of view using the field-of-view mechanical mechanism.

12. The image capturing system according to claim 11, wherein the external device further includes:

an instruction unit implemented by at least one of the second at least one processor and configured to give an instruction to transmit the command for controlling the field-of-view mechanical mechanism, and a storage configured to store a time at which the instruction to transmit the command for controlling the field-of-view mechanical mechanism is given, wherein the command for controlling the field-of-view mechanical mechanism transmitted with the transmitting unit includes the time stored in the storage.

13. The image capturing system according to claim 12, wherein the amount-of-change determination unit determines the amount of change based on the time included in the command for controlling the field-of-view mechanical mechanism received by the receiving unit.

14. A method for controlling an image capturing apparatus that communicates with an external device, wherein the image capturing apparatus includes a field-of-view mechanical mechanism configured to change a field of view for capturing an image of a subject, the method comprising receiving, from the external device, a command for controlling the field-of-view mechanical mechanism;

controlling, when a command is received to start to change a field of view using the field-of-view mechanical mechanism, the field-of-view mechanical mechanism to start to change the field of view; and determining an amount of change in the field of view using the field-of-view mechanical mechanism, wherein, controlling includes controlling the field-of-view mechanical mechanism such that the determined amount of change in the field of view becomes a predetermined amount or more, irrespective of whether a command is received to stop changing the field of view using the field-of-view mechanical mechanism.

15. A method for controlling an image capturing system having an image capturing apparatus and an external device that communicates with the image capturing apparatus, wherein the image capturing apparatus includes a field-of-view mechanical mechanism configured to change a field of view for capturing an image of a subject, the method comprising:

receiving, in the image capturing apparatus from the external device, a command for controlling the field-of-view mechanical mechanism;

controlling, in the image capturing apparatus and when a command is received to start to change a field of view using the field-of-view mechanical mechanism, the field-of-view mechanical mechanism to start to change the field of view;

determining, in the image capturing apparatus, an amount of change in the field of view using the field-of-view mechanical mechanism; and transmitting, from the external device to the image capturing apparatus, a command for controlling the field-of-view mechanical mechanism, wherein controlling includes controlling the field-of-view mechanical mechanism such that the controlling amount of change in the field of view becomes a predetermined amount or more, irrespective of whether a command is received to stop changing the field of view using the field-of-view mechanical mechanism.

16. A non-transitory computer-readable storage medium storing a computer program causing a computer to execute the method according to claim 14.

* * * * *